United States Patent [19]

Harbin

[11] Patent Number: 4,886,407
[45] Date of Patent: Dec. 12, 1989

[54] ALIGNMENT AND RETENTION MECHANISM FOR BARREL NUT FASTENER APPARATUS

[75] Inventor: Thomas E. Harbin, Westminster, Calif.

[73] Assignee: Rexnord Holdings Inc., Calif.

[21] Appl. No.: 256,687

[22] Filed: Oct. 12, 1988

[51] Int. Cl.$^4$ .............................................. F16B 37/00
[52] U.S. Cl. ..................... 411/104; 411/108; 411/970
[58] Field of Search ................ 411/84, 85, 103, 104, 411/108, 109, 111, 112, 261, 313, 314, 352, 353, 368, 371, 432, 544, 929.2, 970

[56] References Cited

U.S. PATENT DOCUMENTS

| | | | |
|---|---|---|---|
| 2,809,686 | 10/1957 | Shepherd | 411/104 |
| 2,825,379 | 3/1958 | Becker | 411/104 |
| 2,903,035 | 9/1959 | Davenport et al. | 411/104 |
| 2,920,672 | 1/1960 | Bronson | 411/104 |
| 3,192,981 | 7/1965 | Le Roy Oliver | 411/104 X |
| 3,192,982 | 7/1965 | Rohe et al. | 411/104 |
| 3,322,177 | 5/1967 | Phelan | 411/104 |

OTHER PUBLICATIONS

Shur-Lok Corporation SLR40 Series, revised 1/67, sheet 1 of 1.

Primary Examiner—Gary L. Smith
Assistant Examiner—Douglas E. Ringel

[57] ABSTRACT

A barrel nut fastener apparatus that includes a nut loosely retained in a prescribed position by a retainer that is adapted to be slidably received in a cylindrical bore formed in a panel. The nut is carried loosely on a seat formed in the retainer and is positioned to threadedly receive a bolt projecting through aligned transverse holes in both the panel and the retainer. A spring is interposed between the nut and the seat, to bias the nut outwardly to a position where a cylindrical extension of the nut projects outwardly into engagement with the panel's transverse hole. This ensures that the fastener apparatus remains in its desired position within the panel's cylindrical hole for proper engagement by a bolt.

4 Claims, 2 Drawing Sheets

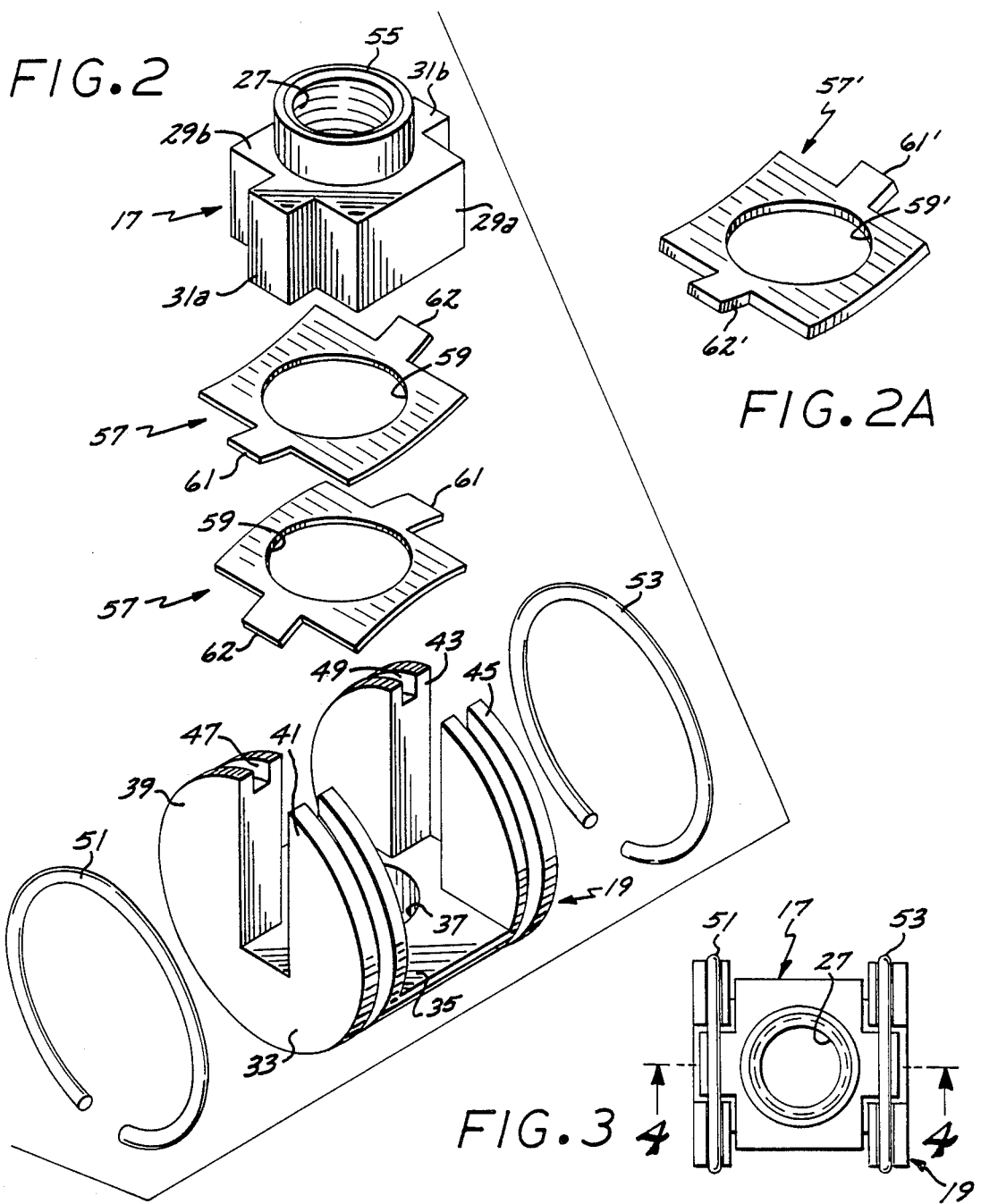

ALIGNMENT AND RETENTION MECHANISM FOR BARREL NUT FASTENER APPARATUS

TECHNICAL FIELD

This invention relates generally to floating nuts, and, more particularly, to floating nuts carried loosely by a generally cylindrical retainer adapted to be slid into a cylindrical bore of a panel. This invention embodies an improvement over the barrel nut fastener apparatus of copending U.S. patent application No. 07/210,798 filed June 24, 1988.

BACKGROUND

Fastener apparatus of this particular kind are useful in fastening together two panels subject to high separation forces and to limited lateral displacement relative to each other. One example of such a fastener apparatus is disclosed in U.S. Pat. No. 3,081,809, issued to F. W. Rohe. The disclosed apparatus includes a nut having a threaded bore for receiving a conventional bolt and a generally cylindrical retainer for loosely supporting the nut in a prescribed position while permitting the nut to move by limited amounts in directions both perpendicular and parallel to the nut's longitudinal axis. A transverse hole is formed in the retainer, aligned with the nut's threaded bore, to guide the bolt into threaded engagement with the nut.

The retainer is sized to slide into a cylindrical bore formed in one of the panels to a position where the retainer's transverse hole aligns with a transverse hole formed in the panel, to permit the bolt to threadedly engage the nut.

Although the barrel nut fastener apparatus described briefly above has proven to be generally satisfactory, it is nevertheless subject to certain drawbacks. For example, only a small portion of the nut extends beyond the perimeter of the transverse hole formed in the retainer, which guides the bolt to the nut. Consequently, very high compressive stresses can arise at the interface between the nut and the retainer, which can sometimes cause the nut to deform.

Further the retainer can sometimes rotate within the cylindrical bore of the panel, about the retainer's longitudinal axis, such that the nut's longitudinal axis, is no longer parallel with the expected longitudinal axis of the bolt. Consequently, cross-threading of the bolt into the nut can sometimes occur. Prior art devices have attempted to solve this particular alignment problem by using spring clips or similar items. While such have proven workable in certain applications, there remains a need for improvement in the alignment and retention feature for the nut portion of the fastener apparatus. Known prior art devices employ a separate spring clip or like element, and assembly with the fastener apparatus is often difficult and unreliable in the field.

It should, therefore, be appreciated that there is a need for a mechanism which in a single-piece assembly permits reliable alignment and retention of the nut with the bolt hole in the panel and thus ensures that the retainer will not rotate about its longitudinal axis, to a point where cross-threading of the bolt into the nut can occur. The present invention fulfills this need.

SUMMARY OF THE INVENTION

Briefly, and in general terms, the present invention is embodied in a barrel nut fastener apparatus that includes a nut and retainer means for loosely retaining the nut in a prescribed position so as to threadedly receive a bolt. The nut and retaining means are configured to engage each other a relatively large area such that localized compressive stresses are reduced and the possibility of material deformation is avoided. More particularly, the nut has a generally cross-shaped configuration in a plane perpendicular to the axis of its threaded bore, this configuration including four generally rectangular wings projecting laterally away from the threaded bore, along two mutually perpendicular transverse axes. The retainer means, which is adapted to be positioned within a cylindrical bore formed in a panel, includes a partial cylindrical body sized to slide into the bore, along with means defining a generally cross-shaped seat for conformably receiving the nut. The seat is sized to permit limited movement of the nut along the transverse axes of the nut wings. In addition, the retainer means includes a hole extending through the partial cylindrical body and emerging in the center portion of the generally cross-shaped seat. This hole aligns with a correspondingly sized hole in the panel, to guide the bolt into threaded engagement with the nut. When the bolt threadedly tightens into the nut and the nut therefore compressively engages the seat of the retainer means, the four wings of the nut distribute this compressive force over an area sufficiently large to ensure that no material deformation of the nut will occur. Also, the nut includes a cylindrical projection that is coaxial with the threaded bore and projects away from the seat of the retainer means.

The retainer means further includes the present invention, i.e. means for yieldably biasing the nut away from the seat such that the cylindrical projection projects into the bolt hole of the panel. Such releasably secures the apparatus in its prescribed position in the cylindrical bore of the panel and ensures that the partial cylindrical body does not rotate to a position where the bolt can become cross-threaded into the nut. In a preferred embodiment, the biasing means can take the form of a pair of flat-bowed spring washers stacked and interposed between the nut and the seat of the retainer means. An opening is formed in each spring, to accommodate the bolt. Each spring preferably has a cross-shaped configuration substantially the same as that of the nut.

The cross-shaped seat of the retainer means is defined by a pair of thin, spaced-apart walls located at each end of the partial cylindrical body. Each of these walls includes an outwardly-facing circular arc segment that forms an extension of the partial cylindrical body. In addition, circular grooves can be formed at each end of the partial cylindrical body, in the cylindrical surface of the body and the walls. Rings are disposed in these grooves, to overlay the two wings of the nut that project along an axis parallel with the axis of the partial cylindrical body, to retain the nut in its prescribed position.

Other features and advantages of the present invention should become apparent from the following description of the preferred embodiment, taken in conjunction with the accompanying drawings, which illustrate, by way of example, the principles of the invention.

BRIEF DESCRIPTION OF THE DRAWINGS

FIG. 2 is an exploded perspective view of the barrel nut fastener apparatus of FIG. 1.

FIG. 2a is a perspective view of an alternate embodiment of the present invention.

FIG. 3 is a top plan view of the barrel nut fastener apparatus of FIG. 1.

FIG. 4 is a side sectional view of the barrel nut fastener apparatus, taken substantially in the direction of the arrows 4—4 in FIG. 3.

FIG. 5 is an end view of the barrel nut fastener apparatus of FIG. 1.

DESCRIPTION OF THE PREFERRED EMBODIMENT

Figure 1:
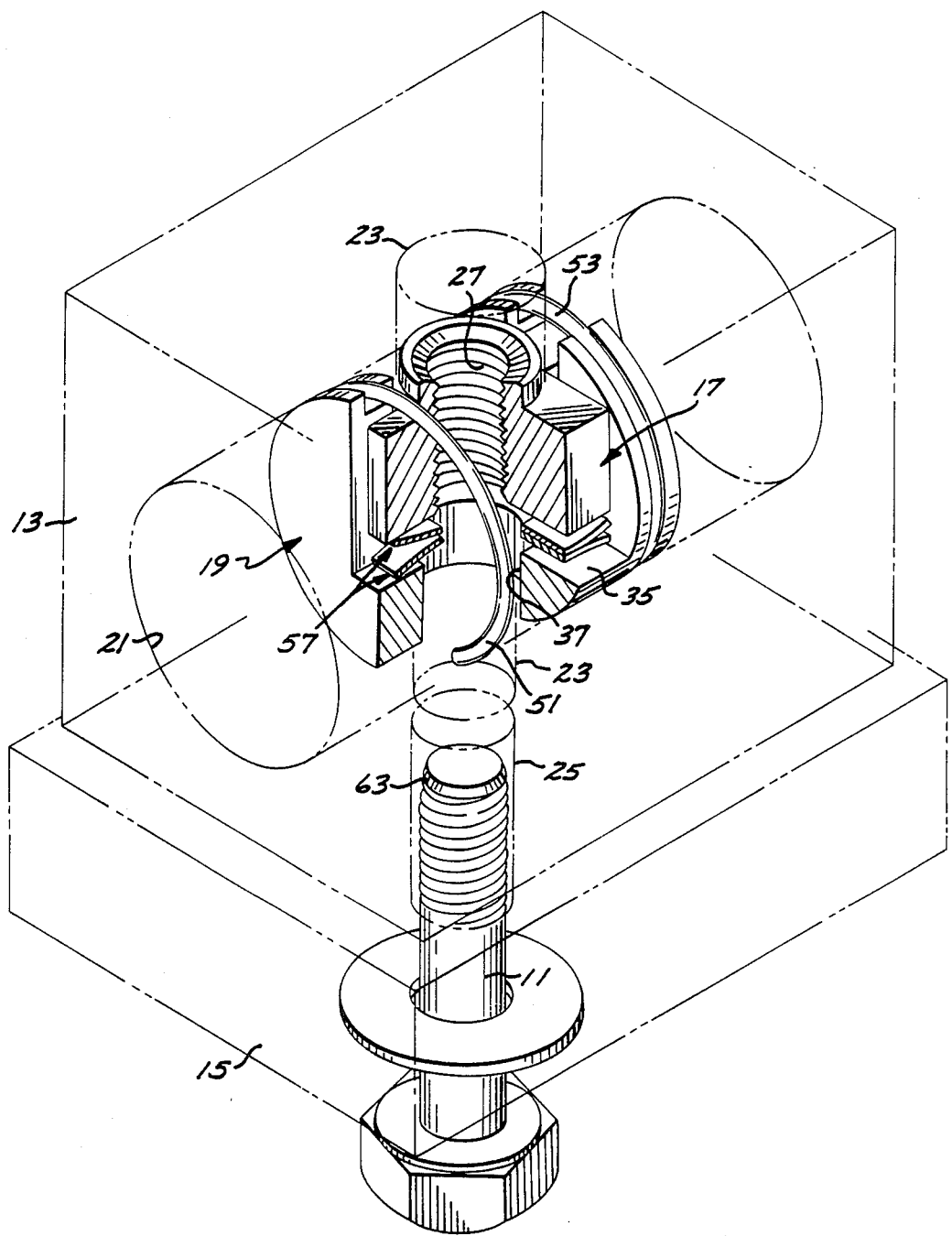
FIG. 1 is a perspective view, partially in section, of a barrel nut fastener apparatus in accordance with the invention, the fastener apparatus being depicted in association with a bolt and two panels to be secured to each other.

With reference now to the drawings, and particularly to FIG. 1, there is shown a fastener apparatus adapted for use with a conventional bolt 11 in fastening together two panels 13 and 15 that are subject to a high separation force and limited lateral displacement relative to each other. The fastener apparatus includes a nut 17 and a retainer 19 for loosely supporting the nut in a prescribed position within a cylindrical bore 21 formed in one of the two panels. The nut is supported in a position such that it can threadedly receive the bolt through aligned transverse holes 23 and 25 formed in the respective panels 13 and 15.

The nut 17 has a threaded bore 27 and a generally cross-shaped configuration in a plane perpendicular to the axis of the bore, as best depicted in FIG. 2. This cross-shaped configuration is characterized by four generally rectangular wings 29a, 29b, 31a and 31b projecting outwardly from the threaded bore, along mutually-perpendicular axes.

The retainer 19 includes a body 33 in the form of a partial cylinder, with a curved surface that constitutes about 120 degrees of a complete cylinder. End walls of the retainer are oriented substantially perpendicular to the partial cylinder's longitudinal axis. The partial cylindrical body is sized to be slid smoothly into the cylindrical bore 21 of the panel 13. A flat seat 35 is defined on the side of the body opposite the partial cylindrical surface, for conformably receiving the nut 17 and supporting it in a position to threadedly receive the bolt 11. A transverse hole 37 extends completely through the body, substantially in the seat's center, to allow the bolt to threadedly engage the nut from its underside.

With the reference again to FIG. 1, it can be seen that the partial cylindrical body 33 of the retainer 19 is slidable into the cylindrical bore 21 of the panel 13, to a point where the transverse hole 37 of the retainer is substantially aligned with the correspondingly-sized transverse holes 23 and 25 formed in the two panels 13 and 15, respectively. The bolt 11 projects through these transverse panel holes and the transverse retainer hole to threadedly engage the threaded bore 27 of the nut 17.

The flat seat 35 formed on one surface of the partial cylindrical body 33 has a cross-shaped configuration that conforms with the cross-shaped configuration of the nut 17. The nut can thereby be received on the seat with two of its wings 31a and 31b projecting along an axis parallel with the body's cylindrical axis and the other two of its wings 29a and 29b oriented transverse to that axis.

The flat, cross-shaped seat 35 is defined by four upstanding walls 39, 41, 43 and 45 located at the corners of the seat. As best shown in FIG. 3, the two walls 39 and 41 located at one end of the partial cylindrical body 33 are spaced apart from each other by an amount sized to accommodate the wing 31a of the nut 17. Similarly, the two remaining walls 43 and 45, located at the opposite end of the body, are spaced apart from each other to accommodate the wing 31b of the nut. Outer surfaces of the four walls are curved by an amount corresponding to the curved surface of the body 33 such that those walls are shaped like extensions of the cylinder.

Circular grooves 47 and 49 are formed in the outer, curved surfaces of the partial cylindrical body 33 and the four walls 39, 41, 43, and 45, for receiving and retaining resilient circular rings 51 and 53, respectively. These rings overlies the wings 31a and 31b of the nut 17, to prevent the nut from moving excessively away from the seat 35, along the axis of its threaded bore 27.

The nut 17 further includes a cylindrical projection 55 coaxial with its threaded bore 27 and located on the side of the nut facing away from the seat 35 of the retainer 19. A preferred embodiment of the present invention is a pair of flat-bowed spring washers or springs 57 interposed between the nut and the seat, for yieldably biasing the nut away from the seat. An opening 59 in the middle of each spring 57 accommodates the bolt 11 and permits the bolt to project upwardly through it to engage the nut. The springs 57 and the cylindrical projection are sized such that, when unloaded, the cylindrical projection projects very slightly beyond the cylindrical margin defined by the four upstanding walls 39, 41, 43 and 45. This is best depicted in FIG. 5.

Each spring 57 preferably has a cross-shaped configuration substantially the same as that of the nut 17. Two rectangular wings 61 and 62 that underlie the wings 31a and 31b of the nut are preferably bent or bowed as best depicted in FIG. 2. If a pair of spring washers is selected, as in the preferred embodiment, they may be stacked upon each other as shown in FIG. 4, however, a single spring 57' may be used as shown in FIG. 2a. To a person skilled in the art other variations for either stacking the chosen springs or for the use of a single spring may be possible in keeping with the principles of the present invention in order to achieve the desired biasing force.

In use, the fastener apparatus, with the nut 17 loosely retained on the seat 35 of the retainer 19 by the two rings 51 and 53 overlying the nut's resilient wings 31a and 31b, is slid into the cylindrical bore 21 of the panel 13. Because the nut's cylindrical projection 55 projects slightly beyond the bore's perimeter, the springs 57 must be compressed slightly to allow the nut to retract sufficiently to bring the cylindrical projection within the bore. When the apparatus has been slid within the bore to a point where the nut's projection and the body's transverse hole 37 are aligned with the transverse bolt hole 23 formed in the panel 13, the springs will yieldably bias the projection outwardly into the transverse bolt hole. This effectively snaps the apparatus into its prescribed, operational location and the operator may hear an audible click indicating that the proper positioning has been achieved by the nut within the bolt hole. The bolt 11 can then be inserted through the transverse holes 23 and 25 of the two panels 13 and 15, to threadedly engage the nut's threaded bore 27. A frusto-conical beveled surface 63 on the leading end of the bolt 11 and a corresponding frusto-conical beveled surface 65 on the underside of the nut 17 ensure a selfcentering of the nut on the bolt, even if they are not precisely initially aligned with each other.

When the bolt 11 is fully tightened into the nut 17, the nut will be drawn downwardly against the yielding resistance of the springs 57, to compressively engage the seat 35 defined on one surface of the retainer's partial cylindrical body 33. The compressive force is distributed over the entire underside of the nut's four wings 29a, 29b, 31a and 31b, which project well beyond the periphery of the body's transverse hole 37. This distribution of force over a relatively large area substantially reduces the possibility that the nut might be physically defined because of an excessive tensile force on the bolt.

When the bolt 11 is initially being threaded into the nut 17, limited misalignment of the bolt and nut can be accommodated by transverse movement of the nut along an axis perpendicular to the bolt's longitudinal axis. The amount of such movement that is permitted is evident in FIG. 3, which depicts narrow gaps between the nut and the four confining walls 39, 41, 43, and 45. This same transverse movement is permitted in some circumstances even after the bolt has been threaded into the nut, when the two panels 13 and 15 undergo limited lateral displacement relative to each other.

From the foregoing description of an improved barrel nut fastener apparatus having reduced susceptibility to material deformation due to an overtightening of a bolt with respect to it, it should be appreciated that the apparatus is easily installed into a cylindrical bore formed in a panel.

The present invention reliably maintains the nut in a prescribed position to receive the bolt. This is accomplished by uniquely positioning spring means between the nut and the retainer such that the nut itself acts to retain its position relative to the bolt hole. The biasing force of the springs releasably positions the top of the nut projection within the bolt hole. Contrary to prior art mechanisms, the present invention is possible with a one-piece assembly of the barrel nut apparatus instead of the conventional two-piece assembly where the spring element is a component purchased and/or assembled separately from the remaining nut and nut retainer assembly.

Although the invention has been described in detail with reference to the presently preferred embodiment, those of ordinary skill in the art will appreciate that various modifications can be made without departing from the invention. Accordingly, the invention is defined only by the following claims and equivalents thereof.

What is claimed is:

1. A barrel nut fastener apparatus adapted to be positioned within a cylindrical bore in a panel and to threadedly receive a bolt extending through a bolt hole in the panel, the bolt hole being oriented transversely to the cylindrical bore and extending on opposite sides of the bore, the apparatus comprising:
    a nut having a threaded bore with a longitudinal axis and further having a cylindrical projection coaxial with the threaded bore; and
    retainer means adapted to be positioned within the cylindrical bore in the panel for supporting the nut in a position to threadedly receive the bolt extending through the bolt hole in the panel oriented transversely to the cylindrical bore and extending on opposite sides of the bore, the retainer means including
        a partial cylindrical body size to be slidable into the cylindrical bore,
        means defining a seat for conformably receiving the nut in a prescribed position, with the cylindrical projection facing away from the seat, while permitting limited movement of the nut along transverse axes perpendicular to the nut's longitudinal axis,
    means for yieldably biasing the nut away from the seat, such that the cylindrical projection projects into the bolt hole of the panel and thereby releasably secures the apparatus in a prescribed position in the cylindrical bore of the panel, and
    means defining a bore extending through the partial cylindrical body and emerging in the center portion of the seat, the bore oriented substantially perpendicular to the seat and configured to guide the bolt into threaded engagement with the nut.

2. A barrel nut fastener apparatus as defined in claim 1, wherein the means for yieldably biasing includes a spring interposed between the nut and the seat of the retainer means, the spring having an opening in it to accommodate the bolt.

3. A barrel nut fastener apparatus as defined in claim 2, wherein the spring has a cross-shaped configuration substantially the same as the configuration of the nut.

4. A barrel nut fastener apparatus to be positioned within a cylindrical bore in a panel and to threadedly receive a bolt extending through a bolt hole in the panel, the bolt hole being oriented transversely to the cylindrical bore and extending on opposite sides of the bore, the apparatus comprising:
    a nut having a threaded bore with a longitudinal axis and further having a generally cross-shaped configuration in a plane perpendicular to the longitudinal axis, the cross-shaped configuration including four generally rectangular wings projecting laterally away from the threaded bore along two mutually-perpendicular transverse axes, wherein the nut further includes a cylindrical projection coaxial with the threaded bore; and
    retainer means adapted to be position within the cylindrical bore in the panel for supporting the nut in a position to threadedly receive the bolt extending through the bolt hole in the panel oriented transversely to the cylindrical bore and extending on opposite sides of the bore, the retainer means including
    a partial cylindrical body size to be slidable into the cylindrical bore,
    means defining a flat, generally cross-shaped seat for conformably receiving the nut in a prescribed position, with the cylindrical projection facing away from the seat, while permitting limited movement of the nut along transverse axes perpendicular to the nut's longitudinal axis, and
    wherein the means defining the generally cross-shaped seat includes four thin spaced-apart walls projecting from the partial cylindrical body, each wall having an outwardly-facing circular arc segment that forms an extension of the partial cylindrical body, the space between each adjacent pair of walls being sized to receive one wing of the nut,
    a spring interposed between the nut and the seat, for yieldably biasing the nut away from the seat such that the cylindrical projection projects into the bolt hole of the panel and thereby releasably secures the apparatus in a prescribed position in the cylindrical bore of the panel, wherein the spring has a cross-shaped configuration substantially and the same as the configuration of the nut, and
    means defining aligned openings extending through the partial cylindrical body and the spring, to guide the bolt into threaded engagement with the nut.

* * * * *